United States Patent [19]

Michaels et al.

[11] 4,015,344
[45] Apr. 5, 1977

[54] AUDIO VISUAL TEACHING METHOD AND APPARATUS

[76] Inventors: Herbert Michaels, 316 W. 79th St., Apt. 1 FW, New York, N.Y. 10024; William Stanton, 29 Fairview Ave., Great Neck, N.Y. 11023; Edward Roll, Laurelton Road, Mount Kisco, N.Y. 10549

[22] Filed: Dec. 28, 1973

[21] Appl. No.: 429,152

Related U.S. Application Data

[63] Continuation of Ser. No. 230,240, Feb. 29, 1972, abandoned.

[52] U.S. Cl. .............................................. 35/29 R
[51] Int. Cl.² ....................................... A63B 69/00
[58] Field of Search ............... 35/29 R, 29 A, 29 F, 35/58; 178/DIG. 35; 350/299, 305; 352/46

[56] References Cited

UNITED STATES PATENTS 3,353,282  11/1967  Sneed .................................. 35/29 R

*Primary Examiner*—Harland S. Skogquist

[57] ABSTRACT

A method and apparatus for teaching physical arts by establishing an image of an instructor in a virtual optical plane, and simultaneously establishing an image of an action-imitating pupil also in a virtual optical plane, to enable the pupil to compare his virtual image with that of the instructor.

A commercial tape, for visual reproduction, shows an instructor performing before a mirror to demonstrate the action to be taught, and shows a view of his back and a view of his reflection in the mirror. When the tape is visually reproduced on an appropriate surface, an auxiliary pupil's mirror disposed edgewise adjacent the surface, lets a practicing pupil see his own image for comparison with the instructor's image.

6 Claims, 14 Drawing Figures

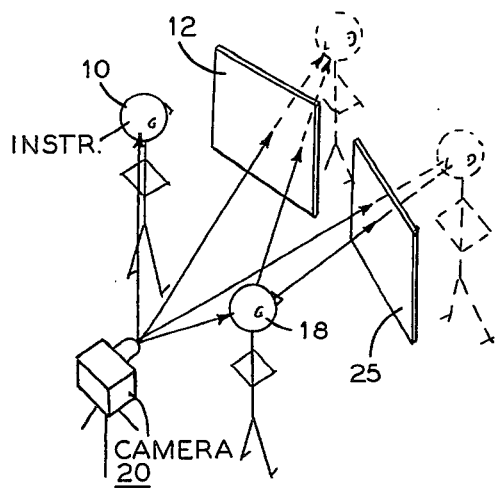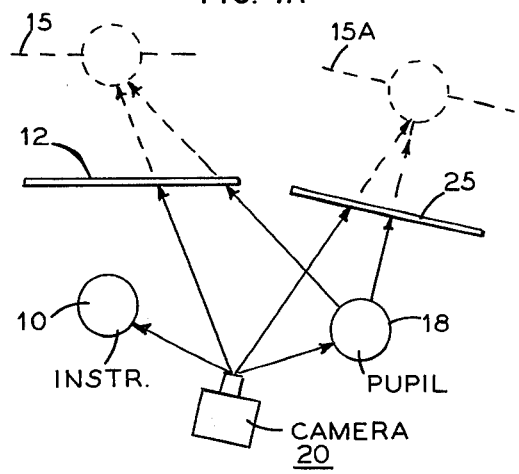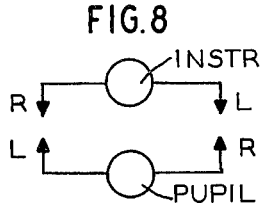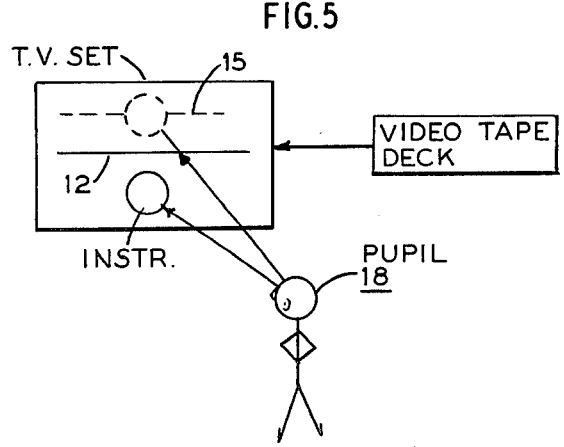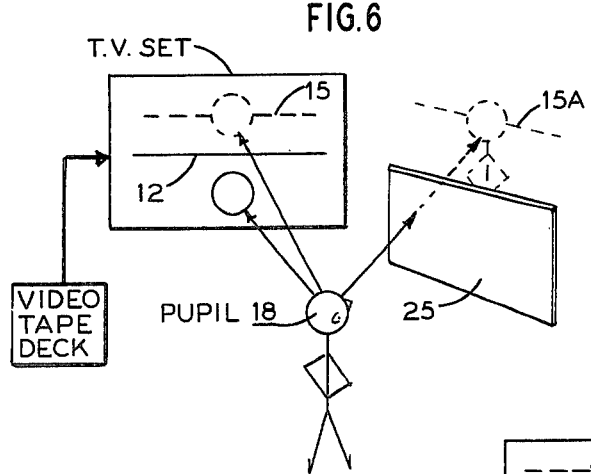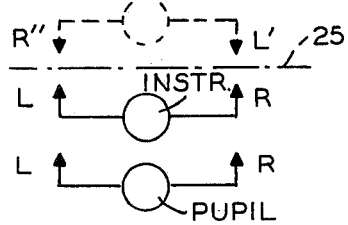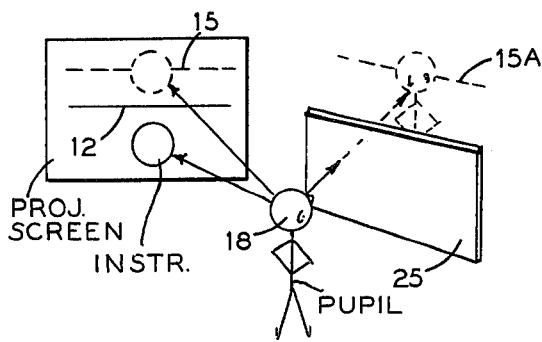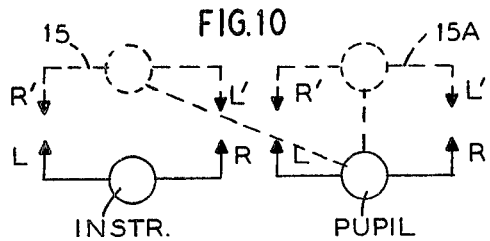

AUDIO VISUAL TEACHING METHOD AND APPARATUS

This is a continuation of application Ser. No. 230,240, filed Feb. 29, 1972, now abandoned.

This invention relates to a method of teaching, involving visual processes, with possible audio aids, for teaching physical arts, such as dancing, fencing, golf, and other activities in which body posture and manipulation must follow patterns or instructions to be properly performed.

In teaching a pupil to perform an activity in the physical arts, a one-to-one relationship must exist between instructor and pupil, insofar as any specific act is concerned. Thus a right-hand action by the instructor must be imitated and followed by a corresponding right-hand action of the pupil. The primary and basic difficulty in establishing such one-to-one relationship, between the instructor and the pupil, arises from the psychological impediment produced by the inability of the pupil to see and relate the performance of the action by the instructor in direct one-to-one relationship to the pupil's own performance of the corresponding action. Such primary and basic psychological impediment is produced because a face-to-face performance of a teaching action by the instructor and the observance of that action by a pupil, are inversely related, by a 180° out-of-phase relationship, since a right-hand operation by an instructor is aligned with, and juxtaposed to, the opposite or the left hand of the student, and similarly with other parts of the two bodies. Consequently, there is a mental and psychological ambiguity and conflict in the mind of the pupil who sees and recognizes the right hand operation of the instructor, as a right-handed operation, but, which, nevertheless, appears, in inverse, as related to a corresponding left-handed operation on the part of the pupil.

On the other hand, if the instructor purposely performs the teaching operation on the reverse hand, so that the instructor's right hand will do what the pupil is supposed and intended to do with his left hand, there is again a psychological conflict in the mind of the pupil, who recognizes nevertheless the right-hand identity of the instructor's right hand, so that unconsciously the pupil tends to follow with his own right hand, instead of the left hand to which the instructor's demonstration is addressed.

In analysis, it is realized that the psychological conflict arises in the mind of the pupil because the action by the instructor and the action by the pupil are not seen in the same or equivalently same optical plane. Here, that conflict is resolved by forming the images of the respective actions by the instructor and by the pupil in the same or in similar virtual optical planes.

An important object of this invention is to provide a method of teaching, and a combination of apparatus for that purpose, that will place the action of an instructor and the action of a pupil in the same or similar optical planes.

Another object of this invention is to provide an instruction and learning affinity between an instructor and a pupil, that will psychologically eliminate psychological conflicts that prevent the pupil from receiving a direct clearly understood bit of information, that will correspond to, and match with, his natural human experience response.

Another object of this invention is to eliminate the need for any preliminary mental and psychological adjustment, in the pupil's mind, before understanding, of the teaching information reaching him.

An important object of the invention is to provide the method and apparatus for practicing the invention, in form that is simple and economical, in ordinary commercial tape form.

Here, the teaching information is directed to a pupil in such a way as to eliminate the usual psychological need to mentally adjust such teaching information, before absorption by the pupil. Such mental adjustment was previously required, because all of the teaching information was not presented in similar or corresponding format, here represented by a same or equivalent virtual plane. Now, however, as taught herein, the teaching information is properly aligned, optically, before it is transmitted for effective mental reception by the pupil. Thus, any possibility of confusion in mental reception is substantially eliminated.

Such information from different optical sources or from different types of sources could result in a difference in speed of understanding, if not properly phase related. Reception of a direct view, from a real plane, and of a reflection image, from a virtual plane, would be out of optical phase, and would require mental and psychological transformation and re-alignment, in the mind of the viewing pupil, that would introduce relative differential time delays between comprehension of different information packets. Thus, the received image information of the instructor's action and the received image information of the pupil's action might be contemporaneous in time of reception, but not in time of understanding. Confusion would result that would denigrate the teaching and learning operation.

In the content and performance of the present invention, several novel concepts are here introduced. One concept is that substantially the entire circular contour of visual observation of an instructor, during his performance, is made directly and immediately visually available to the pupil for guidance in the teaching and learning relationship. For that purpose the usual only-half visual observation of direct view of the instructor, is now combined with a mirror image of the instructor, in such a way that the pupil's eyes receive a substantially omni-visual view of the instructor, front and back; and such omni-visual view, as a teaching instruction, in psychologically and instantly complete, and requires no psychological readjustment in the mind of the viewing pupil.

The method here involves the performance of a physical action by an instructor, which is contemporaneously demonstrated, or is later to be demonstrated, visually to a pupil, in such manner as to enable the pupil to see substantially every phase of the performance of the action by the instructor, and the performance is demonstrated in such manner as to enable the pupil to imitate and reproduce the instructor's performance, with visual comparator means to enable the pupil to compare his performance with the performance of the instructor, and in a way that will enable the pupil to achieve complete correspondence between his performance and that of the instructor.

An important object and particular feature of this invention is the arrangement whereby both front and rear views are seen of an instructor in performance, to provide a universal view of the instructor, substantially in full 360° effect.

Another object of this invention is to provide a system and apparatus to enable a pupil contemporaneously, or alone in the future, to observe the instructor's performance and to observe the pupil's own imitation for comparison, in the process of learning.

Another object of this invention is to provide equipment including commercial recorded material and reproducing equipment, that may be purchased by a pupil and that will exhibit an instructor's performance, with which a pupil may compare his own performance in the process of learning in his own privacy and convenience.

The intelligence of a full circular view of the instructor's demonstration, as transmitted to the pupil, either by direct observation and related reflection, contemporaneously, or by observation in a reproduced visual projection, without the presence of the instructor, permits the pupil's mind to adjust readily to a direct comprehension of all of the individual elements of the instructor's performance, to such an extent, that the pupil may readily follow them. This feature is more beneficial than only a partial view of the instructor's action in performance.

A further object in the evolution of this invention is to provide a visual system in which a pupil's omnivisual view of the instructor may be directly compared and combined with the pupil's own view of himself in a mirror, so that all of the psychological impressions that he receives of the movements and actions of the instructor may be directly related to and compared with his own movements, as he sees them reflected in a mirror, and as he innately feels and understands his own body movements, such as back movements not directly visible in that mirror.

By his mentally combining his full view of the instructor performing the action to be taught, with his own view of himself, as the pupil sees himself also in a related mirror, there is no need to mentally convert any visual information that the pupil receives, and, consequently, there is no psychological barrier or delay introduced in correlating the visual information he receives of the instructor's performance and the information that he receives of his own personal performance.

Generally, in one view of its elementary fundamentals, the system includes an instructor looking into a main mirror and performing an action that is to be taught, with the pupil standing in a position where he can see the instructor's image in the primary mirror and where the pupil can also see the instructor's back that is not imaged in the mirror. That back view of the instructor supplements the mirrored image corresponding to the mirrored front view of the instructor. Thus, the pupil sees both the back view and the front view of the instructor so that the pupil has substantially a full circular view of the instructor during the instructor's performance.

In order to relate the pupil's performance to that of the instructor, and to provide a comparison to permit matching the two performances, — that of the pupil to that of the instructor, — a second mirror, which is here referred to as the auxiliary or the pupil's mirror, is so positioned, near the main or instructor's mirror, to enable the pupil to see both the instructor's image and the pupil's own image in the two adjacent mirrors.

Now can be appreciated an important feature of the invention, which places both images, — that of the instructor and that of the pupil, — in similar optical virtual planes.

Such positioning of both the main instructor's mirror and the auxiliary pupil's mirror, to be directly visible to the pupil, is a primary feature of importance in this invention, since it enables the pupil to receive the signal information from the instructor's performance and the signal information from his own performance in optically in-phase relationship, since both are in a virtual plane. Thus, the pupil may readily, in his own mind, relate and compare his performance with that of the instructor, and modify his own performance, as may be necessary, in order to establish a matching relationship between his performance and that of the instructor.

This relationship is particularly important, since a primary purpose of this invention is to provide a method and system of operation whereby commercial visual tapes or records may be prepared, of any one of a number of physical activities of artistic cultural or skillful content, by skilled masters of those arts or activities, to serve to provide audio-visual teaching demonstrations to one or more pupils, without the physical presence of the instructor, and, in fact, at any place and time convenient to the pupil above.

Thus, the pupil needs only a record tape, an exhibiting apparatus and his own mirror, to enable him to observe his own image and compare it with the image of the instructor exhibited to him. The teaching and instruction of any physical art can thus be made accessible to anyone as a pupil, to be effective at a time and place of his own selection.

With the arrangement here shown of the instructor before his mirror and the pupil facing his auxiliary mirror, and with the pupil spaced somewhat further away from the two mirrors than the instructor is from his mirror, the pupil can see three important sources of information, namely, 1. the movements of the back of the instructor during his performance;
2. the movements of the front of the instructor during his performance;
3. and the reflection of the pupil showing his attempted movements to correspond to the related movements of the instructor.

At the same time, the movements of the back of the instructor's body, as seen by the pupil, provide a guide to the pupil to adapt his own body with a corresponding movement, which he innately understands, to attempt to match those back movements of the instructor.

In matching those back movements of the instructor, the pupil can essentially feel what he himself is doing with his own body, and to that extent practically follows and matches the movements of the instructor. At the same time, the pupil sees the front view image of the instructor in the mirror, and, thus, the pupil has a double view, for full perspective, on the instructor's performance, so that the pupil can further check his own movements, as he sees them in his own reflected image, and instantly compares and matches his movements with those that he sees in the reflected image of the instructor.

Generally, the instructor is present in the immediate neighborhood of the pupil, for direct guidance, both visually and with additional oral instruction.

The primary important feature of the present invention is that, because of its fullness of demonstration, a suitable record may be made of the instructor's performance, so that a visual or audio-visual record may be reproduced, for observance by the pupil, with substantially the same full teaching effect and benefit, even though the instructor is not physically present.

Thus the record, with suitable reproducing apparatus, and combined with a reflecting mirror to show the pupil his own reflection while following the instructor's movements, makes the invention available in simple economic commercial form.

This feature of full reproducibility of the full teaching content of an instructor's performance is possible in view of the concept of showing the performance of the instructor in substantially full circular vision. The teaching is similarly thus established by visually reproducing the video record that re-enacts the teaching operation of the instructor, in a suitable framework that will permit the pupil's visual observance of the instructor and the pupil's imitation and attempted duplication of the instructor's performance, to be viewed by the pupil and compared.

Thus, the performance of an action by the instructor may be recorded to be exhibited later, as and where convenient, to show a visual reproduction of the back of the body of the instructor, as well as the reflected front image of the instructor in a virtual plane related to a mirror before which the instructor will be demonstrating his performance. In this case, the pupil's mirror may be physically disposed adjacent the surface on which the performance of the instructor is being visually exhibited.

Where the performance of an instructor is being exhibited on a video tube, as by a closed circuit television system, from the record tape, the pupil's mirror may be disposed adjacent one side edge of the viewing surface of the tube, to enable the viewing pupil to observe the performance shown by the tube, and to observe his own performance, for comparison. Similarly, where the record is reproduced on a viewing screen by means of a projector, from a photographic film, the pupil's mirror will be disposed adjacent the edge of the viewing screen, so the pupil may see both the visual record as projected on the screen and his own virtual image in his mirror, for direct comparison of the instructor's performance and the performance attempted by the pupil.

Obviously, the pupil's mirror may be adjusted angularly to suit the conditions of best visibility of both virtual images to the practicing pupil. The teaching demonstration may include both the visual content on the tube or on the projected screen, and, as well, an accompanying audio guidance, which may be related to the pictorial showing in any conventional manner.

The manner in which this invention functions and is applied, in method and in apparatus, is described in more detail in the following specification, and in the accompanying drawings, in which FIG. 1 is a schematic representation of a perspective view showing an instructor performing before a mirror, and shows his virtual image, indicated as formed in the mirror;

FIG. 1A is a schematic plan view of the instructor and mirror of FIG. 1, to indicate the location of the instructor's image in and at a region defined for simplicity as a virtual plane;

FIG. 2 is a view similar to that in FIG. 1, with the addition of an observer, such as a pupil, who sees both the instructor and the instructor's image in the mirror; and the figure indicates also the presence of a camera or the like, if employed, to take a photographic record for later visually reproducing the action of the instructor as seen directly, coupled with his action in his image as seen in the mirror, to permit future reproduction and exhibition of the actions of the instructor and his image, for teaching demonstration, or the like;

FIG. 2A is a schematic plan view of the arrangement in FIG. 2, and serves to show the location of the virtual image of the instructor at the virtual plane, and as seen by the pupil, or by the camera;

FIG. 3 is a schematic view considered as an extended development of the arrangement in FIG. 2, with the addition of a separate auxiliary mirror for the observer or pupil previously indicated in FIG. 2, with the pupil in position to see the back of the instructor and the instructor's virtual front image in the mirror, and with the pupil able to see as well, the pupil's own virtual image in an auxiliary mirror, for comparison;

FIG. 4 is a schematic view similar to that in FIG. 3, except that a camera or equivalent photographic equipment is included, in addition to the pupil, to observe and obtain a continuous record of the performance that shows the instructor and his reflected virtual image, and includes the performance that also shows the pupil and the reflected virtual image of the pupil in the auxiliary mirror;

FIG. 4A is a schematic plan view of the arrangement shown in FIG. 4;

FIG. 5 is a view showing an arrangement of apparatus in which the photographic record taken by the camera in FIG. 2 is reproduced, for example, on a kinescope, for a pupil who is positioned to observe the reproduced picture with suitable audio track for simple instruction;

FIG. 6 is a schematic view of a system such as in FIG. 5, with an auxiliary mirror for the pupil, to provide his own image to establish a situation substantially equivalent to that shown in FIG. 3, to enable the pupil to follow the teaching performance of the instructor, by comparing the two virtual images.

FIG. 7 is a schematic view of a simple system, similar to that in FIG. 6, in which the teaching instruction of the instructor and his image are exhibited on a projection screen, with suitable audio accompaniment, with the auxiliary mirror for the pupil to provide his virtual image.

FIG. 8 is a schematic view of an instructor facing a pupil to be taught, and shows the direct inversion of the respective right hands and left hands, that introduces a direct ambiguity in the pupil's mind;

Figure 1:
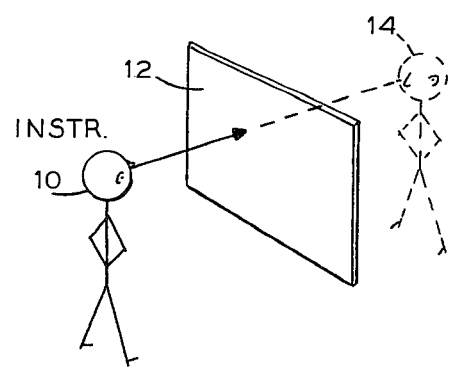
Figure 1A:
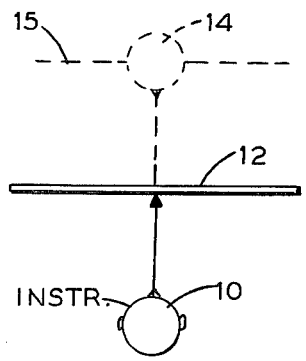

FIG. 9 is a schematic view showing an optical inversion of the instructor in a mirror, as seen by a pupil facing the mirror, and shows a virtual ambiguity that arises in the pupil's mind because the virtual image of the instructor's left hand is shown as the apparent or virtual right hand of the instructor, corresponding in appearance and position to the real inversion in the direct view of the instructor in FIG. 8;

FIG. 10 shows how the direct and the virtual ambiguities of FIGS. 8 and 9, respectively, are overcome in this invention, by forming virtual images of both the instructor and the pupil, in adjacent frames, thereby permitting the pupil to compare both the instructor's image and his own image in virtual image planes, with equivalent inversions, so no ambiguities exist which would require mental transformation in the pupil's mind before intellectual understanding and acceptance.

As expressed above, the function and purpose of this system is to provide observable contemporaneous live teaching performances or actions, or optical, or photographic reproductions, or both, which may be either in continuous mode or in sequential stills, to show physical operations and actions of a demonstrating instructor, in order to enable a viewing pupil to observe and learn how to perform the same actions, by imitating those observed actions of the instructor. To do that the pupil relates his own performance to the performance of the instructor, by comparing his own performance, in an auxiliary mirror, with the instructor's performance in the primary mirror. Thereby, the pupil achieves a maximum degree of accuracy in imitation and learning. The performance of the instructor, as being observed, may be contemporaneous or exhibited from a prior recordation.

In conventional teaching practices heretofore employed, two procedures have been and are being utilized. One procedure involves an instructor facing a pupil and demonstrating an action to the pupil, who looks first at the instructor to observe an elevational front view of the instructor in performance, and then tries to imitate. This type of teaching has been unsatisfactory because it naturally introduces the ambiguity and confusion of inversion, as shown in FIG. 8. In that type of teaching, the body of the pupil viewing the performance of a demonstrating instuctor is 180° out-of-phase visually and optically with respect to the instructor. The pupil's left hand is opposite the facing instructor's right hand, and the pupil's right hand is opposite the facing instructor's left hand. Yet, the pupil's right hand must follow the instructor's right hand. There is therefore a direct inversion, and a psychological disparity between what the pupil sees and what his intended operation is to be, due to such 180° physical disposition out-of-phase, or inversion. The pupil must mentally re-invert. Hence the psychological ambiguity and confusion, and the resulting difficulty in absorbing and learning the teaching.

A second method of procedure was to introduce a re-inversion, before the teaching information is transmitted to the pupil, by having the instructor perform in front of and facing a mirror, and letting the pupil observe only the inverted virtual front view image of the instructor shown in the mirror, as in FIG. 9. This inversion in the virtual image does tend to show the instructor's left hand in a position opposite a pupil's left hand so that there is apparently a seeming one-to-one optical correspondence. However, there is, nevertheless, still a psychological ambiguity introduced, since the image is still not a true front view of the instructor. In the virtual image, the instructor's real left hand appears as a right hand to the pupil, due to the optical experience of the pupil's mind. There, as far as the effect on the pupil is concerned, the inversion though optical, is nevertheless an inversion that still introduces a psychological ambiguity, which makes it difficult for the pupil to relate directly and immediately to the image, in trying to adapt his physical movements to those of the image. The ambiguity arises, because the image left hand of the instructor's virtual image actually shows the action of the instructor's real right hand. When the pupil attempts to follow the image left hand of the virtual image with his own left hand, he is, in error, actually attempting to follow the instructor's real right hand, instead of the instructor's real left hand, which is intended.

Comparing FIGS. 8 and 9, the ambiguity is seen as being similarly present in both cases.

This invention eliminates the ambiguities by relating proper images of instructor and of pupil for delivery to the pupil's mind. The manner in which that is done is illustrated in the sequence of the drawings, and is schematically indicated in FIG. 10, to provide both the virtual image of instructor and the virtual image of pupil in virtual planes.

As shown in FIG. 1, an instructor 10 stands before a mirror 12; and a front view virtual image 14 of the instructor 10 is reproduced optically in the mirror 12, in a virtual plane. The instructor 10 performs his teaching operations, preferably facing the mirror 12, within the scope of the operations. The image 14 as seen in the mirror is a mirrored image, which means that the image is inverted and virtual, and, in effect, is 180° out-of-phase optically. Thus, the right hand of the instructor will appear to be the left hand of the image, and the left hand of the instructor will appear to be the right hand of the image. This phenomenon creates a problem of optical ambiguity to an observing pupil, which is solved for the purpose of this invention. This ambiguity is shown in FIG. 9.

A mirror technique has been used in inumerable cases to try to teach an observing pupil how an action is to be performed, but, for proper effect, it must be done in a way to avoid all ambiguities. For the purpose of this description, the physical operation of dancing will be considered and discussed, using feet and hand gestures. Obviously, any physical skill and dexterity may be taught.

It will be realized, of course, that any operation performed in front of a mirror will be subject to inversion of the parts of the body of the performer in front of the mirror.

Figure 2:
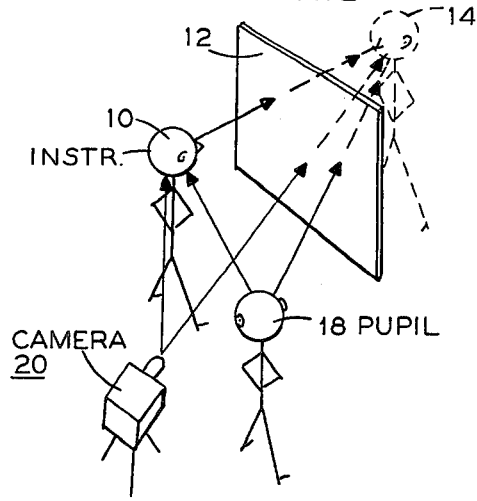

Thus, for example, in FIG. 2, the eye of the pupil 18 sees the front elevational view of the virtual image 14, and a partial view of the back of the instructor 10, depending upon the position of the pupil behind the instructor.

For the purpose of the description of FIG. 2 it is merely sufficient to note that the pupil 18 sees an additional view of the instructor besides the virtual front view seen in the virtual image 14. Also in FIG. 2, is indicated a photographic device, such as a camera 20, to illustrate this same point, namely, that a total view is recorded that includes a partial view of the back of the instructor 10 and also the front elevational view in the virtual image 14, which total view is to be used later for one aspect of the invention, for teaching a pupil who is practising alone. At this time, it is sufficient merely to note that the camera 20 will be positioned to take a full view of the reflected virtual image 14 and a view that will show a substantial back area 22 of the instructor. The camera should generally be positioned where the pupil will later stand to view the visual reproduction.

Figure 2A:
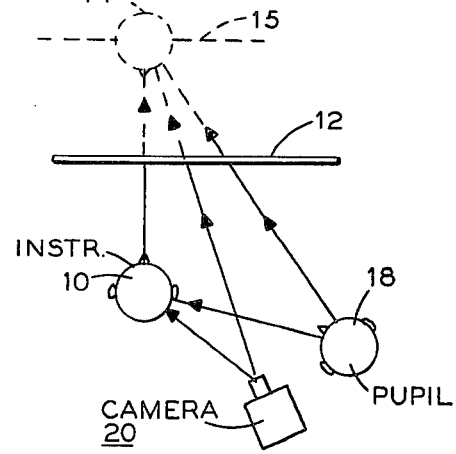

In the plan view of FIG. 2A, the disposition of the pupil or of the camera is plainly indicated, with the implication that both the back and the reflected views of the instructor are currently seen, or are photographed for future use, with or without the presence of the instructor.

Figure 3:
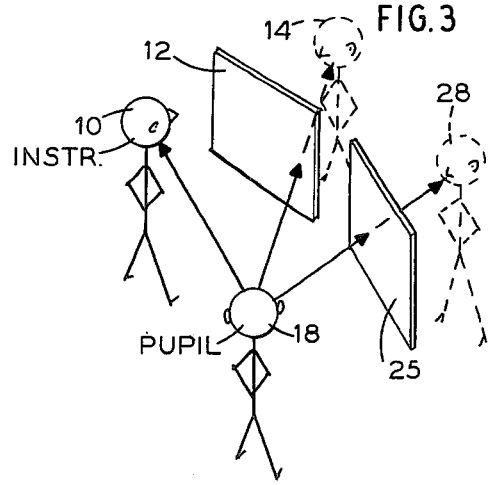
FIG. 3A is a schematic plan view of the arrangement in FIG. 3, and serves to show the location of the instructor's virtual image and of the pupil's virtual image, so the pupil can see both virtual images for direct and immediate comparison.
Figure 3A:
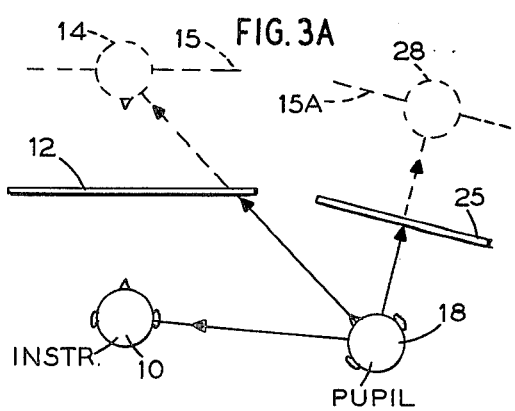

In accordance with the operation of the present invention, the position of the pupil will be appropriately determined, as will be now explained. In FIG. 3 is shown one of the full modes of the invention. The instructor 10 stands before the mirror 12 and produces an image 14 in the mirror, as in FIGS. 1 and 2. In addition, the pupil 18 stands where he may see the image 14 as a front view, and where he may also see as much as possible of the back of the instructor 10, so that the pupil essentially has a complete or universal view of the instructor, in combining the maximum back view 20 and the full front image 14 observed in the mirror.

The special aspect and addition that is particularly characteristic of this invention is now shown in FIG. 3, as a second or adjunct mirror 25 to function in cooperation with the main mirror 12, in the teaching process. The additional or adjunct mirror 25 is positioned so that the pupil 18 may see his own image 28 in the auxiliary mirror 25, from substantially the same position from which he is observing the instructor 10 and the front image 14 of the instructor 10 in the main mirror 12. The arrangement as shown in FIG. 3 provides the functional psychological feature of this invention, which is to enable the pupil to compare his inverted image with the inverted image of the instructor, and thereby to establish a true one-to-one relationship between the movements of his body and the related movements of the instructor's body.

Since the image of the pupil is now placed in the same virtual optical domain as the image of the instructor, it is possible to establish a true one-to-one relationship within that common optical domain, and thereby obviate psychological ambiguities and consequent difficulties that would arise in the mind of the pupil in performing the mental operation required in relating and comparing two acts in different optical domains.

It will thus be seen that this important feature of the invention consists in establishing both a view of the instructor and a view of the pupil in a common optical domain, which is the virtual plane for each view. Within that virtual optical domain, it becomes possible to establish externally of the pupil's mind, the one-to-one relationship that is ultimately necessary in teaching a pupil to learn physical movements by imitating and relating his own physical movements to those of a demonstrating instructor. By establishing that relationship externally, it is not necessary for the pupil to effect a transformation in his own mind.

Another aspect of the invention, by extension, carries the features of this invention to an advanced phase. It is highly desirable to be able to provide instructions to a pupil in such manner that the need for actual physical presence of an instructor may be obviated, so the pupil can practice and learn alone.

It is therefore another important feature and object of this invention to present the teaching aspect of the invention as a reproduction of an actual performance, so that a pupil, solely alone, and by himself, may practice the reproduced showing of the instructor in performance, without actually requiring the presence of an instructor. Such teaching without the necessity of the presence of an instructor can obviously increase the teaching potential of one good instructor to any number of pupils, so long as there is available to the pupil an optical reproduction of an optically recorded teaching demonstration by the instructor. Thus, for example, if a view of the instructor 10 and his image 14 were available to a pupil 18, as in FIG. 3, the pupil could practice alone.

To accomplish that, the photographic record of the instructor in FIG. 2 as taken by the camera 20, to show the desirable two views of the instructor, that is, his full back view, or substantially his full back view; and his corresponding contemporaneous front image in the mirror can then be reproduced on a kinescope, or on a suitable reproducing surface or curtain, as in FIG. 5, before which the pupil may practice his own performance and compare his performance, through his auxiliary mirror 25, with the view of the instructor as shown on the kinescope in FIG. 6, or on the curtain in FIG. 7. In this case, of course, the full benefit of the invention is obtained by the placement of the auxiliary pupil's mirror in position alongside the kinescope or the curtain, so that the pupil may see his own image in the auxiliary mirror, while he is, at the same time, observing the projected picture of the demonstrating instructor on the kinescope, or on the curtain.

Moreover, a pupil so performing the operation being taught, can benefit from the completely relaxed atmosphere, where he is completely alone and free of any possible criticism or advice that must necessarily have some critical content. Repetitive exhibition of the recorded showing permits the pupil to adopt his own speed of learning.

In another mode of the teaching process, the procedure indicated in FIG. 4 may be followed. At some selected point of instruction, a video tape may be taken to record the performance of the instructor and of his image, together with the performance of the pupil and his image. The photographic record may then be reproduced to permit visual comparison of both performances and to note the non-correspondences, or errors, to permit appropriate corrections.

As an extension of this mode, the two virtual images may be concurrently reproduced on a single surface for comparison, visible to the pupil so he can see immediately his errors that require correction.

As an extension of this mode shown in FIG. 4, a split film reproduction may be made for comparing a student's progress with the demonstration of the instructor, at a later time, and separate from the instructor. At any selected point of the reproduction of the instructor's film, the student may cut in and take a picture film of his own performance in motion, that should be synchronous with the instructor's film. Subsequent showing of both films in synchronism will permit visual comparison, to detect any variations that might require correction.

Similarly, a closed circuit television system, with suitable camera and kinescope, may be employed, in accordance with this invention, to permit comparison of a student's current performance on the kinescope, with the performance of an instructor in a reproduced pictorial showing.

In its commercial form, the invention includes a video tape on which a teaching routine, such as dancing, for example, is recorded, as by the camera in FIG. 2, which is reproduceable on a cathode ray tube, as in FIGS. 5 and 6, or on a projection screen, as in FIG. 7. An adjunct or auxiliary mirror to reflect the pupil's performance is to be applied and disposed adjacent the tube or the viewing screen to constitute the combination of this invention, and enabling the method of the invention to be performed.

This invention has been found to accelerate the learning process of dancers, individually, and within a group, in rehearsals in preparation for plays, and in dancing studios, where a supervisor need not be the instructor, since the viewing screens would provide such instruction.

Thus, the invention provides for a system including method and apparatus, for recording a teaching demonstration of an instructor, on a suitable recording medium, to be commercially available, for example, as a tape, and to be readily visually reproduceable to a pupil, at any time and at a place convenient to the pupil, where the pupil can compare his performance with the visual reproduction of the instructor's performance from the tape.

Dancing was mentioned as one physical skill to be taught. Obviously the number of skills to be taught is unlimited, including, as a few, golf, tennis, gymnastics, in the fields of exercise. Similarly, the development of physical skills may be taught in industry, where an instructor's performance is to be utilized as a guide.

The invention is not limited specifically to the details as shown, but may be modified without departing from the spirit and scope of the invention, as defined in the claims.

What is claimed is:

1. Apparatus for practicing a method for teaching physical arts and skills, such as, for example, dancing, which comprises:
   a. establishing the active image of a performing instructor in a virtual optical plane;
   b. simultaneously establishing in a similar virtual optical plane, the active performing image of a pupil imitating the action of the instructor; and
   c. placing both virtual images in position for direct simultaneous viewing by the pupil while performing, to enable the pupil to observe both images for instructive comparison, comprising, in combination,
   a photographic record of a main mirror in front of the performing instructor to show a front elevational mirror image of the instructor while performing;
   and an auxiliary mirror to be positioned to one side of a visual reproduction of said main mirror and image, to enable an observer, such as a pupil, to stand where he can see the main mirror image of said instructor, while also seeing his own performing image in the auxiliary mirror.

2. Apparatus for teaching a physical skill as in claim 1, in which
   said photographic record shows both the elevational view of the back of the instructor as well as his front mirror image while performing.

3. Teaching apparatus as in claim 1, comprising
   a recorded tape carrying a record thereon to visually reproduce and exhibit a teaching demonstration of an instructor performing before a mirror, and to show his virtual image in action in said mirror;
   means for reproducing and visually exhibiting said recorded matter to show at least the virtual image of said instructor in performance;
   and reflection means disposed adjacent said exhibiting means to reflect and show the virtual image of a pupil performing before said reflection means, and to enable said pupil to compare his own virtual reflection with that of said instructor.

4. Teaching apparatus for performing a method for teaching physical arts and skills, such as, for example, dancing, which comprises:
   a. establishing the active image of a performing instructor in a virtual optical plane;
   b. simultaneously establishing in a similar virtual optical plane, the active performing image of a pupil imitating the action of the instructor; and
   c. placing both virtual images in position for direct simultaneous viewing by the pupil while performing, to enable the pupil to observe both images for instructive comparison, consisting of
   a reproduceable recording medium carrying a recording of the activity of a direct view of a performing instructor before a mirror, and a recording of the simultaneous activity of a reflected view of said instructor in said mirror while so performing.

5. Apparatus for practicing a method for teaching physical arts and skills, such as, for example, dancing, which comprises:
   a. establishing the active image of a performing instructor in a virtual optical plane;
   b. simultaneously establishing in a similar virtual optical plane, the active performing image of a pupil imitating the action of the instructor; and
   c. placing both virtual images in position for direct simultaneous viewing by the pupil while performing, to enable the pupil to observe both images for instructive comparison, comprising
   a reproduceable record that will exhibit, upon reproduction, a direct view of an instructor performing before a mirror, the view of the mirror itself, and the reflected image of the performing instructor in said mirror.

6. An audio-visual teaching method, for teaching manual and physical skills, such as, for example, dancing, by showing photographically the performance by an instructor of an action to be taught, by his performance before a mirror, and by having the pupil observe and learn, by personal participation, in observing, imitating and reproducing the instructor's performance and simultaneously comparing his own imitating performance with that of the instructor, which method comprises:
   a. the step of performing the action to be taught, by the instructor performing that action before a mirror;
   b. photographically recording the reflected mirror image of the instructor as well as the direct view of the instructor, while he is so performing the action to be taught;
   c. visually reproducing the both views of the instructor in performance; and
   d. producing a reflected mirror image view of a pupil in imitating performance, to enable the pupil to see and compare his performance with that of the instructor for instructive benefit.

* * * * *